(12) United States Patent
Fukuoka et al.

(10) Patent No.: US 7,221,149 B2
(45) Date of Patent: May 22, 2007

(54) MOVING OBJECT DETECTION DEVICE

(75) Inventors: Seiji Fukuoka, Tokyo (JP); Eiichi Nunokawa, Tokyo (JP); Toshinao Kido, Tokyo (JP); Kunihiko Fukui, Saitama (JP)

(73) Assignees: TDK Corporation, Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/407,331

(22) Filed: Apr. 20, 2006

(65) Prior Publication Data
US 2006/0244439 A1 Nov. 2, 2006

(30) Foreign Application Priority Data
Apr. 28, 2005 (JP) .............................. 2005-131744

(51) Int. Cl.
G01P 3/44 (2006.01)
G01R 33/06 (2006.01)
(52) U.S. Cl. ...................... 324/174; 324/173
(58) Field of Classification Search ............... 324/173, 324/174
See application file for complete search history.

(56) References Cited
U.S. PATENT DOCUMENTS 5,483,157 A * 1/1996 Nakatake et al. ........... 324/174
5,821,744 A 10/1998 Shinjo et al.
6,781,367 B2 * 8/2004 Sakanoue ................ 324/207.2
2003/0001566 A1 1/2003 Tsuge et al.

FOREIGN PATENT DOCUMENTS

| JP | 3-44586 | 2/1991 |
|----|---------|--------|
| JP | 4-21962 U | 2/1992 |
| JP | 9-105757 | 4/1997 |
| JP | 10-31028 | 2/1998 |
| JP | 10-206514 | 8/1998 |
| JP | 11-101658 | 4/1999 |
| JP | 2000-214176 | 8/2000 |
| JP | 2001-165702 | 6/2001 |
| JP | 2003-14498 | 1/2003 |
| JP | 2004-309448 | 11/2004 |

* cited by examiner

Primary Examiner—Reena Aurora
(74) Attorney, Agent, or Firm—Leydig, Voit & Mayer, Ltd.

(57) ABSTRACT

A moving object detection device has a magnetic sensor element, a permanent magnet for applying a magnetic field to the magnetic sensor element; a board on which electronic parts are mounted, a holder; and a case. The holder has an integral approximately box-shaped support part to hold the magnet and the board, and the holder is inserted into the case so that the magnetic sensor element, the permanent magnet, and the board are contained in the case. The holder and the case are fitted and fastened to each other by concave-convex-shaped elements.

6 Claims, 8 Drawing Sheets

MOVING OBJECT DETECTION DEVICE

BACKGROUND OF THE INVENTION

1. Field of the Invention

The present invention relates to a detection device for detecting change in a magnetic field. More particularly, the invention relates to a moving object detection device suitably used when moving state of an object to be detected is magnetically detected. The object makes linear movement or rotary movement such as a rack or a gear made of soft magnetic substance in an industrial machine tool, or an engine of an automobile.

2. Description of the Prior Art

There is a method using a property that an output signal of a magnetic sensor element is changed in response to a soft magnetic body coming close to the magnetic sensor element applied magnetic field by a permanent magnet, in order to detect moving state of an object which makes a linear movement or rotary movement such as a rack or a gear of the soft magnetic body in an industrial machine tool or an engine of an automobile, etc.

A moving object detection device was proposed in Japanese Utility Model Application Laid-Open No. 4-21962, in which a housing is integrally formed by a resin, so that the housing can contain a magnetic sensor element to be a major element for detection of a moving state of an object to be detected, a permanent magnet for applying a magnetic field to the magnetic sensor element and terminals to which a protection (processing) circuit part receiving an output signal of the magnetic sensor element is connected for outputting a detected electric signal to the outside.

In such a moving object detection device, since the magnetic sensor element and protection (processing) circuit parts connected to the terminals by soldering are molded by integrally covering them with a resin, special consideration in designing is necessary to avoid any stress applied to the magnetic sensor element and the electronic parts, which are susceptible to stress. In addition, careful control in designing or manufacturing is necessary to avoid solder-connected spots being disconnected or shortened by heat and stress at the time of molding resin.

It may be also possible that the resin will be molded after attaching the magnetic sensor element and circuit parts for protecting (processing) the output signal on a board, however, some consideration is still required to avoid any occasion that the circuit parts are destroyed, and the soldered spots between the terminals and each circuit parts are disconnected or short when the board is warped or bent by the heat and stress at the time of molding resin.

Japanese Patent Application Laid-Open No. 2000-214176 discloses a device that overcomes those problems, for example. In the device, a magnetic sensor element, a permanent magnet for applying magnetic field to the magnetic sensor element, and a board implemented with a circuit for protecting (processing) an output signal of the magnetic sensor element are held by a holder and contained in a case made of resin. When an opening of the case is sealed with sealing resin, a passage hole for the sealing resin is provided on the board so as to prevent warping or bending of the board at the time of sealing with the sealing resin and hence, to prevent occurrence of disconnection or short circuit failure at a solder-connected spot and destruction of a circuit part.

The moving object detection device in accordance with the Japanese Patent Application Laid-Open No. 2000-214176 will be described according to a side sectional view in FIG. 10.

In FIG. 10, reference numeral 1 denotes a magnetic sensor element and reference numeral 2 for a permanent magnet for applying a required magnetic field to the magnetic sensor element, and the magnetic sensor element 1 and the permanent magnet 2 are held on a resin holder 3. A circuit part 6 for protecting (processing) an output signal of the magnetic sensor element 1 is implemented on a board 4, and the board 4 is also held on the holder 3. A resin passage hole 4a is formed substantially at the center of the board 4. When sealing resin is poured in a resin case 10 to seal an opening of the case, the sealing resin can pass through the hole 4a. Each end of conductors 5 is connected to the board 4. The conductors 5 are provided for leading an electric signal to the outside, which is made from an output signal detected by the magnetic sensor element 1 by a signal protection (processing) circuit on the board 4.

The resin case 10 is in the cylindrical shape with a bottom, and one end is an opening part 11 before sealed with the sealing resin, and a notch portion 12 is further formed from an edge of the opening part 11. A cover grommet 15 made of resin is fitted to the notch portion 12, and its inner surface 16 constitutes a mechanical fitting portion of a connector. A grommet 20 arranged inside the cover grommet 15 is an elastic body such as rubber, and the conductors 5 are inserted to each of through holes of the grommet 20.

Outer circumferential portions of the case 10 and the cover grommet 15 are covered with a molding body 25 of the sealing resin to form an attaching portion 26 and to seal the opening part 11 of the case 10.

In Japanese Patent Application Laid-Open No. 2000-214176, the device has such a structure that the magnetic sensor element, the permanent magnet and the board for the output signal protection (processing) circuit are held by the holder, the periphery is sealed by resin molding, the mounting portion to be mounted on an industrial machine tool or an automobile engine is formed and the connector portion for wiring/connection to an electric control system of the industrial machine tool or the automobile engine is formed. Accordingly, it has the following problems.

(1) When a quantity in one time production is small (i.e., small-lot production), preparation of die set for resin molding requires a number of processes, and improvement of production efficiency is limited.

(2) Since the sealing resin is poured and filled in the periphery of electronic parts implemented on a board for an output signal protection (processing) circuit, stress caused by expansion/contraction of the sealing resin is applied to the electronic parts and the connected spots due to change in atmospheric temperature in actual use. Thus, it is necessary to take measures for alleviating this stress in order to improve resistance to thermal shock.

(3) Since a waterproof structure is adopted by welding of the molded sealing resin to the resin case, it is necessary means for preventing separation of the welding interface of the sealing resin caused by change in atmospheric temperature in order to improve a life with respect to waterproof property.

SUMMARY OF THE INVENTION

In view of the above problems, a first object of the present invention is to provide a moving object detection device which can simplify structure, improve production efficiency and reduce manufacturing costs by adopting a structure that a magnetic sensor element, a permanent magnet and a board on which electronic parts are implemented are held by a holder, and the holder and a case for containing them are fitted and fastened.

A second object of the present invention is to provide a moving object detection device which can remove application of stress caused by expansion/contraction of sealing resin to the electronic parts and connected spots on the holder and improve resistance to thermal shock as well as reliability because of fitting and fastening the holder and the case to each other without pouring/filling the sealing resin into the case which covers the holder.

The other objects as well as new features of the invention are described in embodiments mentioned below.

In order to achieve the above objects, the present invention provides a moving object detection device comprising: a magnetic sensor element; a permanent magnet for applying a magnetic field to the magnetic sensor element; a board on which electronic parts are implemented; a holder; and a case; the holder integrally having an approximately box-shaped support part to hold the magnet and the board, the holder inserted into the case so that the magnetic sensor element, the permanent magnet and the board are contained in the case, and the holder and the case are fitted and fastened to each other by concave-convex shapes formed thereto.

In the moving object detection device, it may comprise a structure that both edge parts of the board project from the support part in the width direction in case of the board being held by the holder, and board guides for insertion of the edge parts are formed on an inner surface of the case.

In the moving object detection device, the permanent magnet may be an NdFe magnet.

In the moving object detection device, an elastic body for watertight seal may be interposed between the holder and the case.

In the moving object detection device, the magnet contained in the case may be supported by a step part formed on the inner surface of the case.

In the moving object detection device, it may comprise a structure that a first guide part is formed both side of the support part of the holder, and a second guide part engaging with the first guide part is formed respectively on the inner surface of the case.

In the moving object detection device, a gap between the board and the inner surface of the case may be filled with a resin within an inner bottom part of the case.

DETAILED DESCRIPTION OF THE PREFERRED EMBODIMENTS

Figure 1:
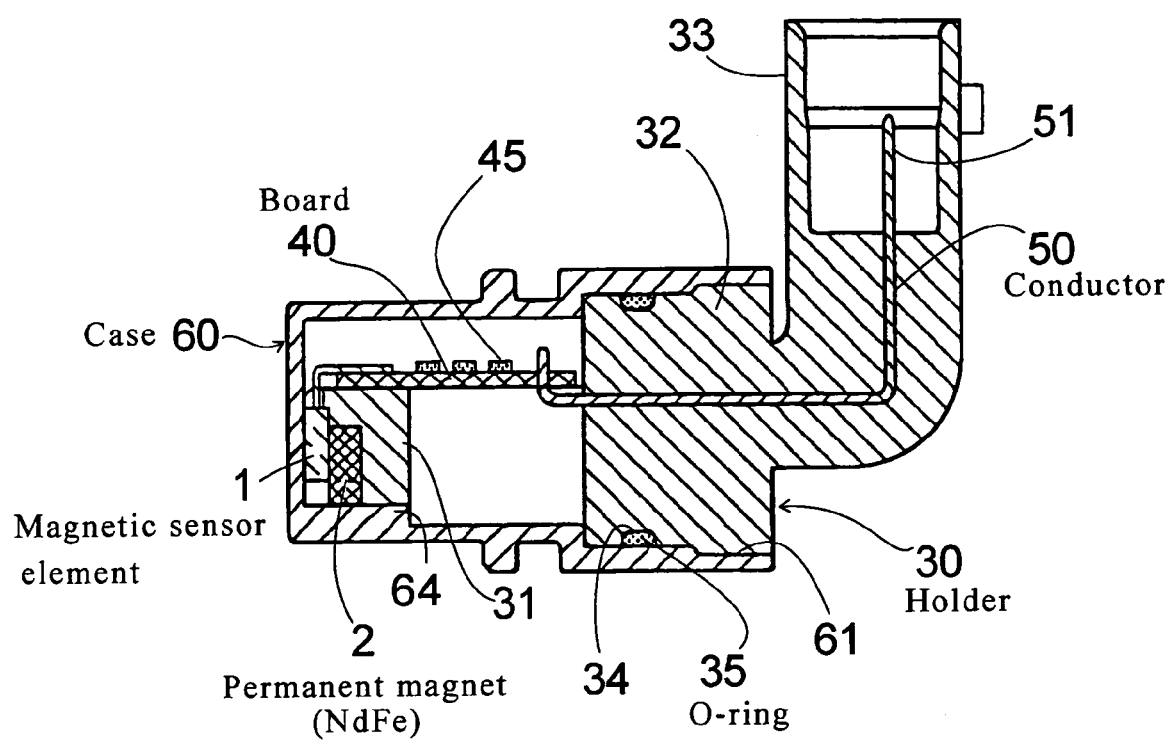
FIG. 1 is a side sectional view showing a first embodiment of a moving object detection device according to the invention.
Figure 2A:
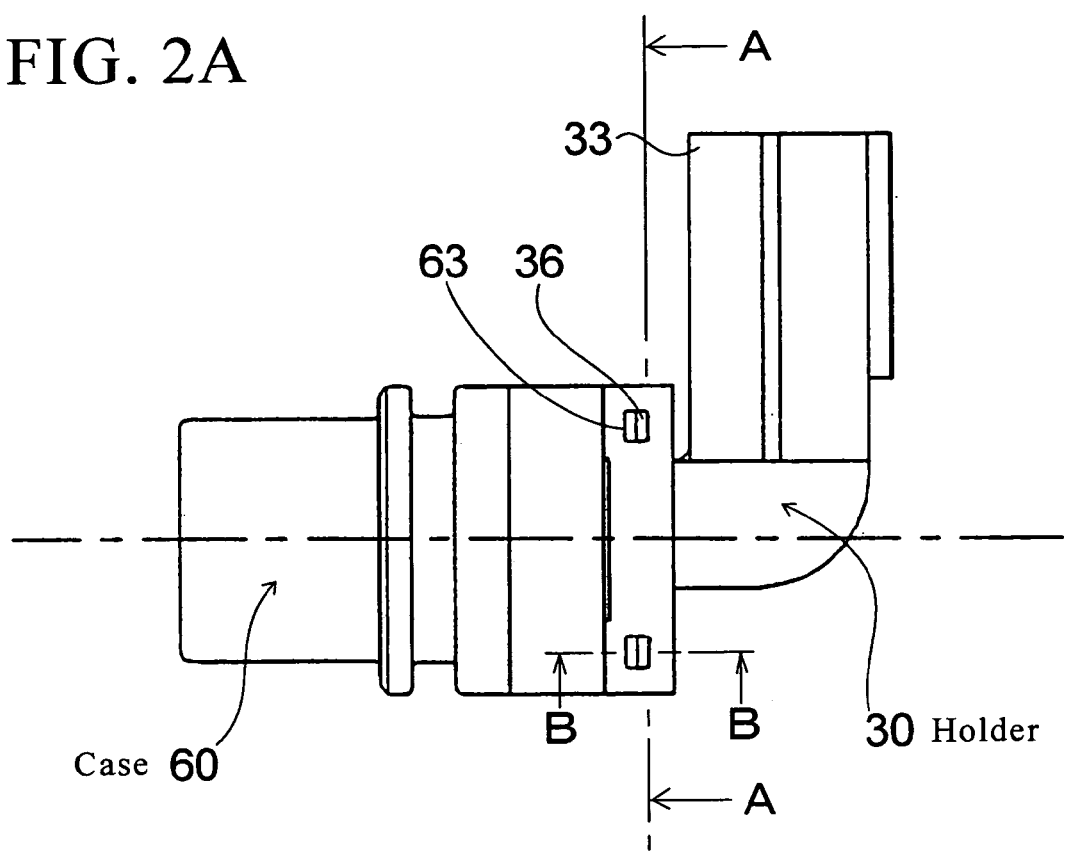
FIG. 2A is a side view showing an overview thereof and a fitting portion of a case and a holder.
Figure 2B:
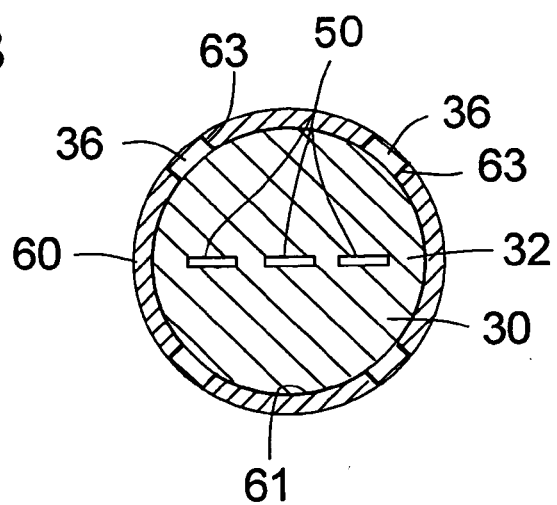
FIG. 2B is a sectional view on A arrow of the fitting portion in FIG. 2A.
Figure 2C:
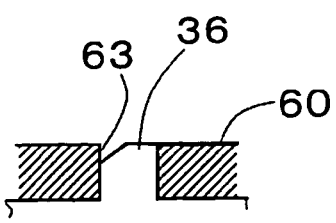
FIG. 2C is a sectional view on B arrow of the fitting portion in FIG. 2A.

Embodiments of the invention as to a moving object detection device will be described below with reference to the drawings.

A first embodiment of the invention is explained referring to FIG. 1 to FIG. 5. In FIG. 1 to FIG. 5, reference numeral 1 denotes a magnetic sensor element such as a Hall effect IC, reference numeral 2 for a permanent magnet made of NdFe magnet for applying a required bias magnetic field to the magnetic sensor element. The magnetic sensor element 1 and the permanent magnet 2 are arranged and held at a tip end of a support part 31 in the approximately box shape integrally formed on a holder 30 made of resin, and a board 40 is supported and fixed at an upper side of the support part 31. The magnetic sensor element 1 is connected to the board 40, on which circuit parts 45 (electronic parts such as IC, chip parts, etc.) for protecting (processing) an output signal of the magnetic sensor element 1 are implemented so as to assemble an output signal protection (processing) circuit.

The resin holder 30 has a columnar plug 32 and a connector 33 for connection. Each end of conductors 50 which penetrate the columnar plug 32 and formed into L-shape are connected to the board 40 respectively. The tips of the conductors 50 protrude into an inner housing in the connector 33 as connector pins 51. At least two conductors 50 are required, so that the conductors 50 lead an output signal to the outside detected by the magnetic sensor element 1.

Figure 5:
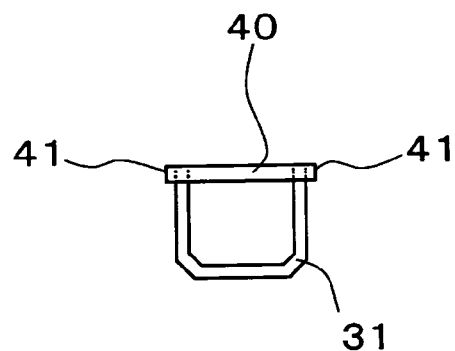
FIG. 5 is a sectional view of V—V of a holder portion in FIG. 3.
Figure 6:
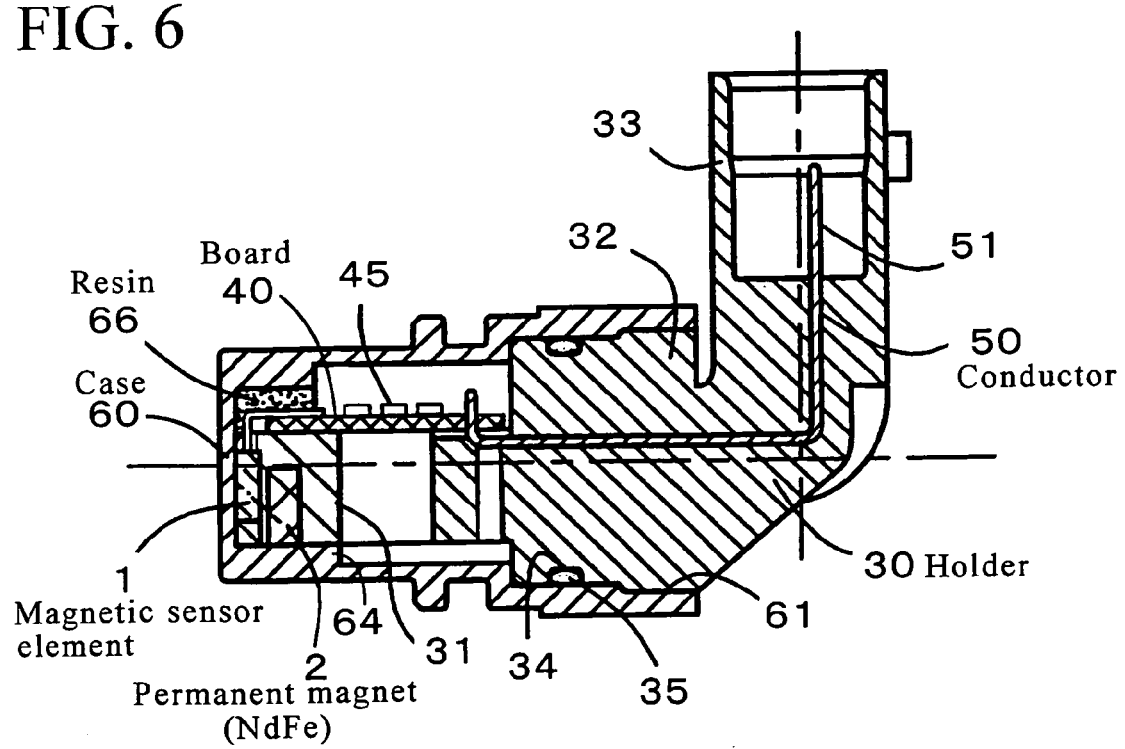
FIG. 6 is a side sectional view showing a second embodiment of a moving object detection device according to the invention.

As shown in FIG. 5, the board 40 held at the upper side of the support part 31 of the holder 30, both edge parts 41 of the board 40 project in the width direction from both sides of the support part 31.

Figure 4A:
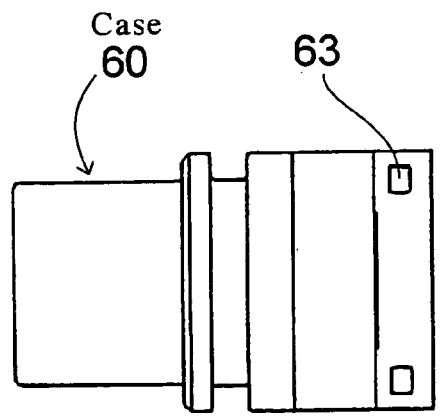
FIG. 4A is a side view of the resin case in the first embodiment.
Figure 4B:
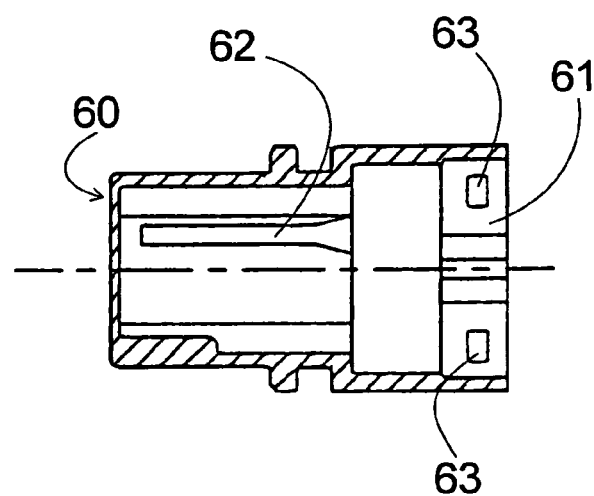
FIG. 4B is a side sectional view of the same.
Figure 4C:
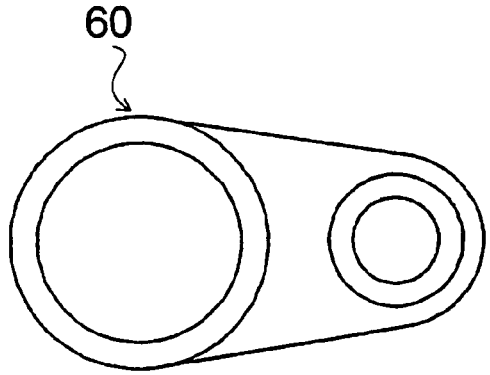
FIG. 4C is a front view of the same.
Figure 4D:
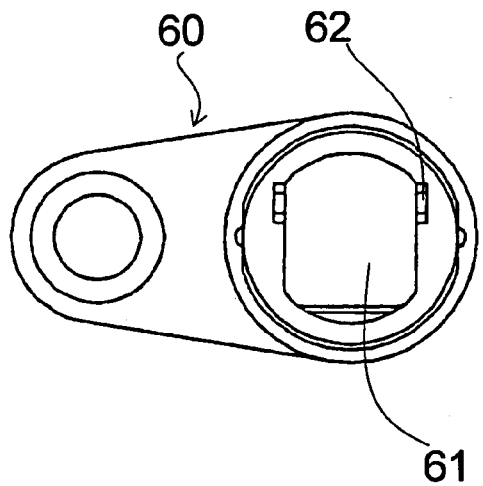
FIG. 4D is a rear view of the same.

On the other hand, a case 60 molded by PBT resin or the like is in the cylindrical shape with a bottom, and as shown in FIG. 4B and FIG. 4D, one end is an opening part 61 (a cylindrical part forming the opening), and concaved board-positioning guide grooves 62 are formed on both sides of an inner wall (inner surface) from the edge of the opening 61 toward the bottom portion. The concaved board-positioning guide grooves 62 are formed for engaging with the both edges of the board 40. In an inner space of the case 60, the approximately box-shaped support part 31 of the holder 30 holding the magnetic sensor element 1, the permanent magnet 2 and the board 40 is contained. In this case, both the edge parts 41 of the board 40 are slidably inserted and supported by the concaved board-positioning guide grooves 62 of the case 60 shown in FIG. 4B and FIG. 4D so that the board 40 does not become loose in the state where the holder 30 is inserted in the case 60. A step part 64 that became high in the step-shaped is formed on the inner surface of the case 60 so that the magnet 2 contained in the case is supported by the step part 64.

Figure 3:
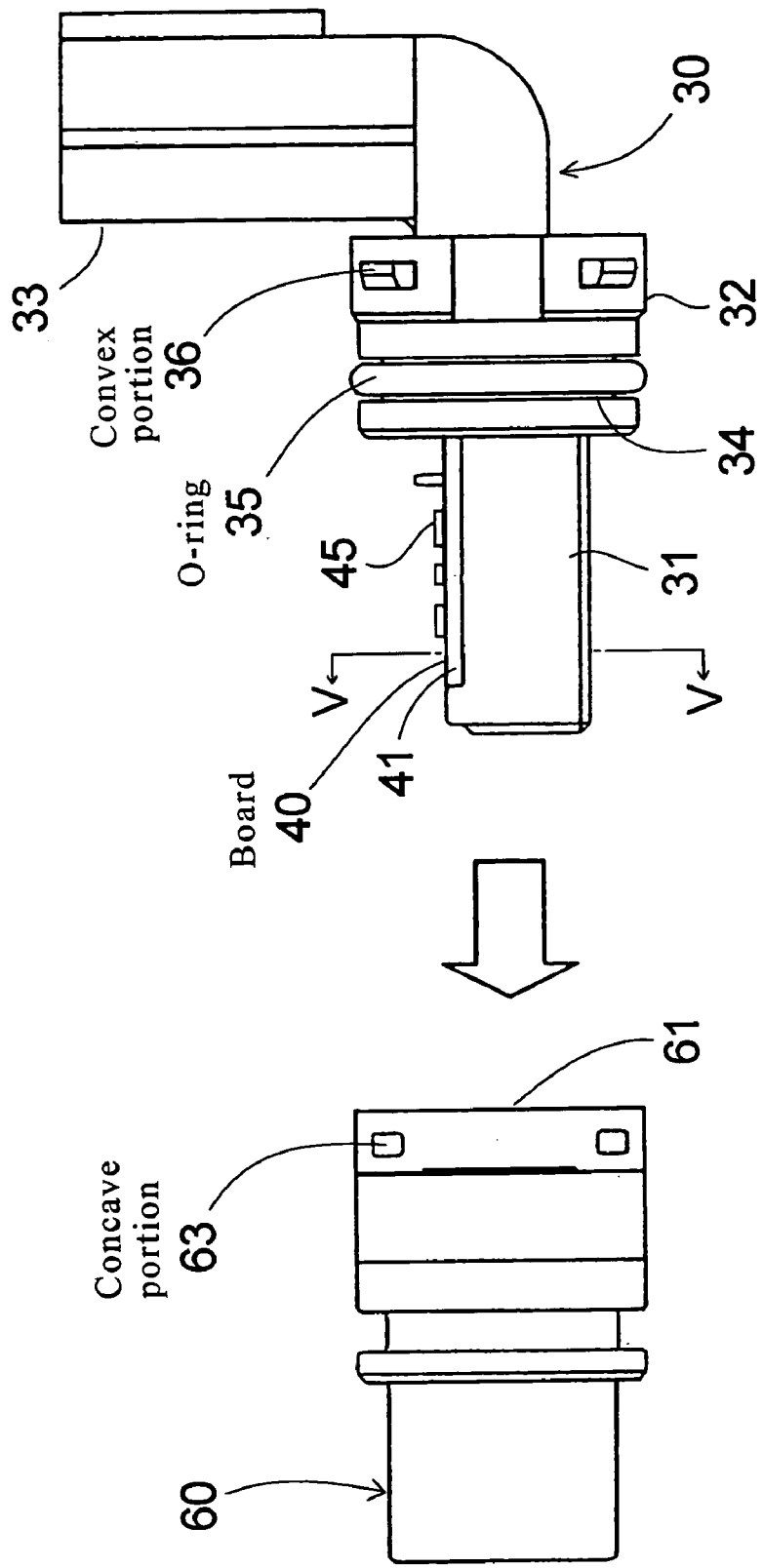
FIG. 3 is an exploded side view of the same.

As shown in FIG. 1 and FIG. 3, a depression 34 is formed around the columnar plug 32 of the holder 30 to be a portion to be fitted in the opening part 61 of the case 60, and an O-ring 35 as an elastic body for watertight sealing such as rubber is attached to the depression 34.

Further, as shown in FIG. 2A–FIG 2C, FIG. 3, and FIG. 4A–FIG 4D, a plurality of convex portions 36 are formed on the columnar plug 32 of the holder 30 to be the fitting portion to the case 60, and a plurality of concave portions 63 to be concave-convex fitting with the convex portions 36 on the holder side are formed on the inner circumferential face of the opening part 61 of the case 60 (the concave portions 63 may penetrate from the inner circumferential face to the outer circumferential face of the opening part 61, or may not reach the outer circumferential face).

The following procedures can be taken to assemble the moving object detection device according to the first embodiment. First, as shown in the exploded side view in FIG. 3, the board 40 on which the circuit parts 45 for protecting (processing) the output signal is implemented is mounted and fixed to the approximately box-shaped support part 31 of the resin holder 30. As shown in FIG. 1, the magnetic sensor element 1 and the permanent magnet 2 are arranged and held to the tip end of the approximately box-shaped support part 31 and fixed so that the positional relations of the magnetic sensor element 1 and the permanent magnet 2 will not change. Output terminals of the magnetic sensor element 1 are also connected to the board 40, and the end of the conductors 50 are connected to the board 40. The tip end of the conductors 50 are arranged as the connector pins 51 in the connector 33 for connection with an external circuit.

Next, the holder 30 in which the O-ring 35 is attached to the depression 34 of the columnar plug 32 is inserted into the opening part 61 of the resin case 60 in the cylindrical shape with a bottom. That is, the columnar plug 32 is fitted with the inside of the opening part 61. At this time, the O-ring 35 is interposed between the columnar plug 32 on the holder side and the inner circumference of the case opening part 61 so as to create a watertight seal between the both. When the magnetic sensor element 1 and the permanent magnet 2 arranged at the tip end of the approximately box-shaped support part 31 of the holder 30 is inserted to the bottom portion of the case 60 in the cylindrical shape with a bottom, the convex portions 36 provided on the columnar plug 32 of the holder 30 are fitted with the concave portions 63 formed in the vicinity of the opened end of the case 60, so that the holder 30 and the case 60 are fastened to and integrated with each other. It is to be noted that both the edge parts 41 of the board 40 contained in the case 60 are engaged with the board-positioning guide concave grooves 62 on the inner face of the case 60 shown in FIG. 4B and FIG. 4D and held so that the board 40 will not vibrate.

According to the first embodiment, the following effects can be obtained.

(1) A structure for integrating the resin holder 30 with the resin case 60 is a fitting structure with the concave-convex shapes, wherein the holder 30 holds the magnetic sensor element 1, the permanent magnet 2, and the board 40 implemented with a circuit for protecting (processing) the output signal of the magnetic sensor element 1, and the resin case 60 covers a required portion of the holder 30 (the portion holding the magnetic sensor element 1, the permanent magnet 2, and the board 40). With such structure, assembly of a moving object detection device is extremely simplified, and production efficiency is increased because it is unnecessary to use resin sealing. As a result, production cost can be reduced.

(2) In the structure, no resin is poured around the magnetic sensor element 1, the permanent magnet 2 and the board 40 contained in the case 60, a stress caused by heat expansion/contraction of the resin is not applied to those parts and their connections, and resistance to thermal shock and hence, reliability can be improved.

(3) Since the board-positioning guide concave grooves 62 are provided on the inner face of the case 60, the board 40 can be contained firmly in the case, a stress caused by board vibration to the circuit parts 45 implemented on the board 40 and the connected spots of the board 40 can be alleviated, vibration resistance is ensured, and reliability can be improved.

(4) By using an NdFe magnet as the permanent magnet 2, material costs can be reduced as compared with the use of a SmCo magnet, and chipping of the magnet can be also prevented.

(5) Since the O-ring 35 is interposed between the holder 30 and the inner circumference of the case 60, sealing is possible while ensuring waterproof in the case, watertight sealing effect and hence, reliability can be improved.

Figure 7:
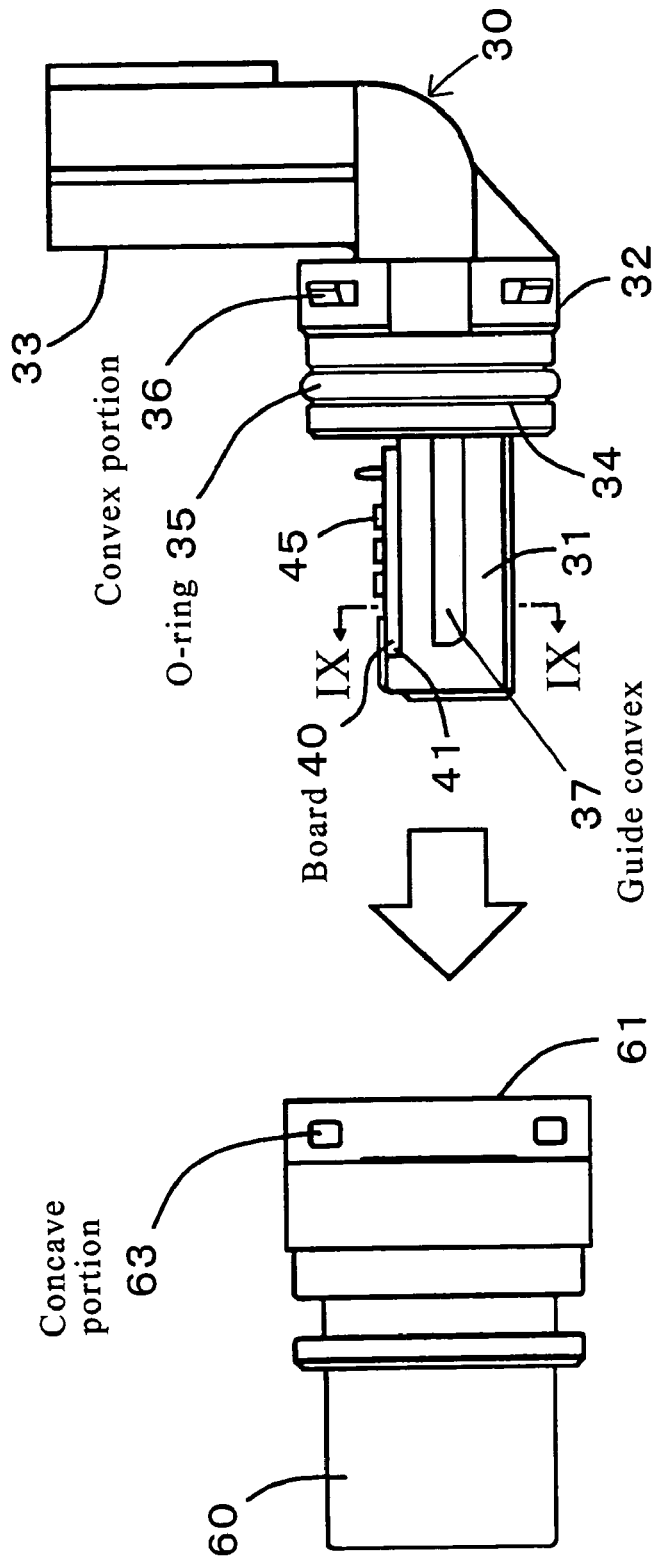
FIG. 7 is an exploded side view of the same.
Figure 8A:
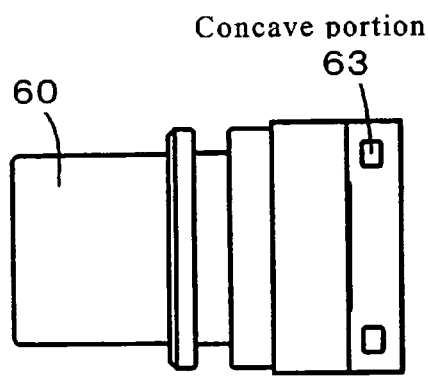
FIG. 8A is a side view of a resin case in the second embodiment.
Figure 8B:
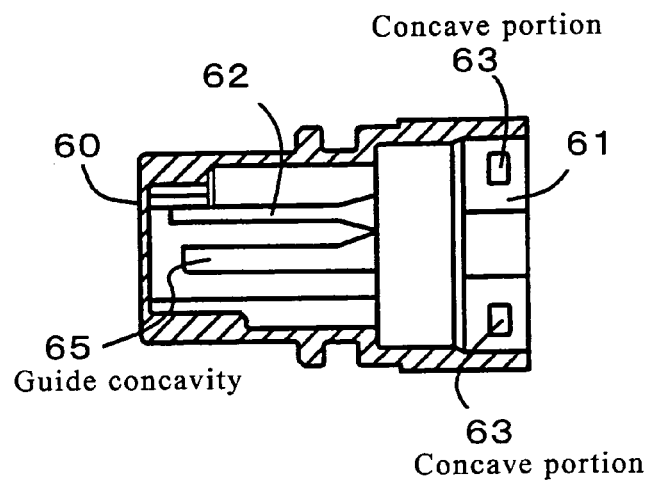
FIG. 8B is a side sectional view of the same.
Figure 8C:
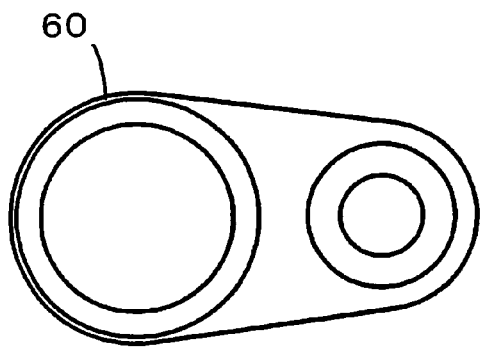
FIG. 8C is a front view of the same.
Figure 8D:
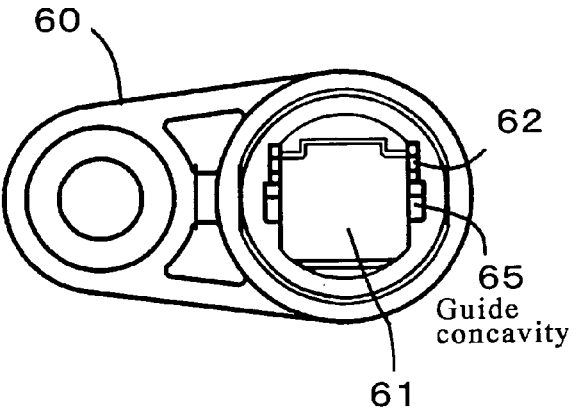
FIG. 8D is a rear view of the same.
Figure 9:
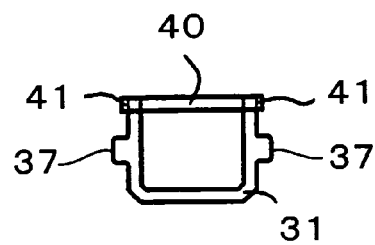
FIG. 9 is a sectional view of IX—IX of a holder portion in FIG. 7.
Figure 10:
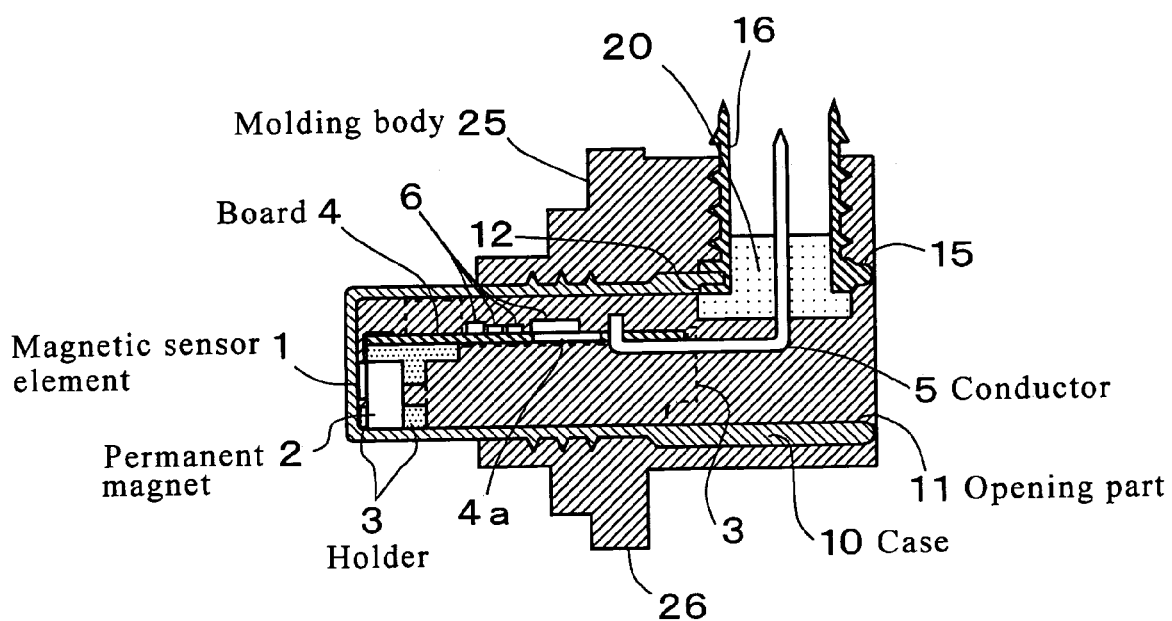
FIG. 10 is a side sectional view of a conventional moving object detection device.

A second embodiment of the invention is explained referring to FIG. 6 to FIG. 9. In FIG. 7 and FIG. 9, a straight bar-shaped guide convex 37 is formed on both sides of the approximately box-shaped support part 31 that is integrally formed on the holder 3, and the direction of the guide convex 37 is the longitudinal direction of the support part 31.

As shown in FIG. 8B and FIG. 8D, guide concavities 65 as concave grooves engaging with the guide convexes 37 are formed on the inner surface of the case 60.

Therefore, the guide concavities 65 of the case 60 and the straight bar-shaped guide convex 37 are engaged, when the holder 30 and the case are fitted and fastened integrally each other. Thus, the support part 31 of the holder 30 is held by the case 60 without any vibration.

Before combining the case 60 with the holder 30, a resin 66 of un-hardening is put in a small quantity in an inner bottom part of the case 60. And the resin 66 stiffened after the combination of the case 60 with the holder 30, fills up a gap between the board 40 and the case 60 within the inner bottom part of the case 60. Accordingly, it can be accomplished that vibrating of the board 40 is more prevented by the above structure.

Other structures of the second embodiment are substantially the same as the first embodiment mentioned above, so the explanations are omitted by putting the same signs at the same or common parts.

In the above embodiments, as an example of the fitting structure in the concave-convex shapes for combining the holder and the case, the convex portions are formed on the holder side and the concave portions on the case side, on the contrary, it may be so constituted that the concave portions are provided on the holder side with the convex portions on the case side.

Further, in the second embodiment, though the guide convex is formed on both sides of the support part of the holder, and the guide concavities are formed on the inner surface of the case, on the contrary, guide concavities are formed on holder side, guide convexes are formed on the case side.

The embodiments of the present invention have been described, but it is obvious for those skilled in the art that the present invention is not limited to them, but various variations and changes can be made within a range described in claims.

As has been described, the moving object detection device in accordance with the present invention can simplify the structure for integrating the holder with the case for covering a required portion of the holder holding the magnetic sensor element, the permanent magnet, and the board implemented with electronic parts, so that the invention can increase production efficiency, resulting in reduced manufacturing costs.

With the structure, no resin is poured (or only a little resin is poured) around the magnetic sensor element, the permanent magnet, and the board contained in the case, and no stress due to thermal expansion and contraction of resin is applied to their parts and connecting spots. Therefore, thermal shock resistance as well as reliability of the moving object detection device can be improved.

When the positioning guides for the board are formed on the inner surface of the case, the stress caused by board vibration to the circuit parts implemented on the board and the connected spots of the board can be alleviated, vibration resistance, and reliability can be improved.

In case of using an NdFe magnet as the permanent magnet, material costs can be reduced as compared with the use of a SmCo magnet, and chipping of the magnet can be also prevented.

When the elastic body for watertight sealing is interposed between the holder and the case, the case and the holder can be sealed while ensuring waterproof, which improves watertight sealing effect, hence the reliability of the moving object detection device can be improved.

When the magnet contained in the case is supported by the step part formed on the inner surface of the case, it is prevented by the step part that the magnet removes from the support of holder formed integrally. Thus, the resistance for vibration and shock is ensured.

When the first guide part is formed both side of the support part of the holder, and the second guide part engaging with the first guide portion is formed respectively on the inner surface of the case, vibration resistance is more ensured because of preventing vibration of the support part.

When the gap between the board and the inner surface of the case is filled with the resin within an inner bottom part of the case, vibration resistance is more ensured because of preventing vibration of the support part.

What is claimed is:

1. A moving object detection device comprising:
    a magnetic sensor element;
    a permanent magnet for applying a magnetic field to the magnetic sensor element;
    a board on which electronic parts are mounted, the board having edges in a width direction;
    a holder having an integral, approximately box-shaped support part holding the magnet and the board, with the edges of the board projecting from the support part in the width direction of the board;
    a case, wherein
        the case includes board guides on inner surfaces of the case that receive the edges of the board,
        the holder is located within the case so that the magnetic sensor element, the permanent magnet, and the board are contained in the case, and
        the holder and the case include respective complementary external and internal surfaces that are fitted and fastened to each other; and
    an elastic body interposed between and making a watertight seal between the holder and the case.

2. The moving object detection device according to claim 1, wherein the permanent magnet is an NdFe magnet.

3. The moving object detection device according to claim 1, wherein the magnet contained in the case is supported by a step on an inner surface of the case.

4. The moving object detection device according to claim 1, including a first guide at sides of the support part of the holder, and a second guide part engaging the first guide part on an inner surface of the case.

5. The moving object detection device according to claim 1, wherein a gap between the board and an inner surface of the case is filled with a resin within an inner part of the case.

6. The moving object detection device according to claim 1, wherein the approximately box-shaped support pan includes an opening on a side supporting the board.

* * * * *